US012647248B2

(12) United States Patent
Adir et al.

(10) Patent No.: US 12,647,248 B2
(45) Date of Patent: Jun. 2, 2026

(54) SELF-ATTENTION IN HOMOMORPHIC ENCRYPTION DEEP LEARNING ARCHITECTURES

(71) Applicant: International Business Machines Corporation, Armonk, NY (US)

(72) Inventors: Allon Adir, Kiryat Tivon (IL); Ramy Masalha, Kafr Qari (IL); Reut Moshe, Tel Aviv (IL); Omri Soceanu, Haifa (IL); Itamar Zimerman, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 18/797,574

(22) Filed: Aug. 8, 2024

(65) Prior Publication Data

US 2026/0046109 A1      Feb. 12, 2026

(51) Int. Cl.
| | |
|---|---|
| *H04L 9/00* | (2022.01) |
| *G06N 3/02* | (2006.01) |
| *G06N 3/045* | (2023.01) |
| *G06N 20/00* | (2019.01) |
| *H04L 41/16* | (2022.01) |

(52) U.S. Cl.
CPC .............. *H04L 9/008* (2013.01); *H04L 41/16* (2013.01); *G06N 3/02* (2013.01); *G06N 3/045* (2023.01); *G06N 20/00* (2019.01)

(58) Field of Classification Search
CPC ........... H04L 9/008; H04L 41/16; G06N 3/02; G06N 3/045; G06N 20/00
See application file for complete search history.

(56) References Cited

U.S. PATENT DOCUMENTS

| | | | | |
|---|---|---|---|---|
| 12,001,577 B1* | 6/2024 | Xiong | ...................... | G06N 3/04 |
| 2017/0317983 A1* | 11/2017 | Kompalli | ............. | G06N 3/0464 |
| 2021/0167948 A1 | 6/2021 | Gama et al. | | |

(Continued)

OTHER PUBLICATIONS

A. A. Badawi, L. Hoang, C. F. Mun, K. Laine and K. M. M. Aung, "PrivFT: Private and Fast Text Classification With Homomorphic Encryption," in IEEE Access, vol. 8, pp. 226544-226556, 2020, doi: 10.1109/ACCESS.2020.3045465. (Year: 2020).*

(Continued)

*Primary Examiner* — Robert B Leung
(74) *Attorney, Agent, or Firm* — CANTOR COLBURN LLP; Anthony Mauricio Pallone

(57) ABSTRACT

Mechanisms are provided for optimizing a deep learning (DL) computer model for homomorphic encryption (HE) workload processing. The mechanisms receive an original DL computer model architecture that is to be optimized for HE workload processing, and modifying the original DL computer model architecture by replacing a self-attention layer of the original DL computer model with an HE friendly self-attention layer that comprises a Power SoftMax function that does not have exponent terms, to thereby generate a modified DL computer model architecture. The mechanisms execute a machine learning training of the modified DL computer model architecture, approximate one or more elements of the Power SoftMax function with polynomials to generate a trained HE optimized DL computer model, and output the trained HE optimized DL computer model for execution on HE workloads.

18 Claims, 6 Drawing Sheets

(56)          References Cited

U.S. PATENT DOCUMENTS

2022/0067513 A1    3/2022  Stevens et al.
2023/0153686 A1    5/2023  Waller et al.

OTHER PUBLICATIONS

R. Podschwadt, D. Takabi, P. Hu, M. H. Rafiei and Z. Cai, "A Survey of Deep Learning Architectures for Privacy-Preserving Machine Learning With Fully Homomorphic Encryption," in IEEE Access, vol. 10, pp. 117477-117500, 2022, doi: 10.1109/ACCESS. 2022.3219049. (Year: 2022).*
J.-W. Lee et al., "Privacy-Preserving Machine Learning With Fully Homomorphic Encryption for Deep Neural Network," in IEEE Access, vol. 10, pp. 30039-30054, 2022, doi: 10.1109/ACCESS. 2022.3159694. (Year: 2022).*
T. Chen et al. "The-x: Privacy-preserving transformer inference with homomorphic encryption," arXiv preprint arXiv:2206.00216. Jun. 1, 2022. (Year: 2022).*
A. Akram, F. Khan, S. Tahir, A. Iqbal, S. A. Shah and A. Baz, "Privacy Preserving Inference for Deep Neural Networks: Optimizing Homomorphic Encryption for Efficient and Secure Classification," in IEEE Access, vol. 12, pp. 15684-15695, 2024, doi: 10.1109/ACCESS.2024.3357145. (Year: 2024).*
R. Podschwadt et al. "SoK: Privacy-preserving Deep Learning with Homomorphic Encryption", arXiv: 2112.12855v2, Jan. 1, 2022. (Year: 2022).*
Cheon, Jung H. et al., "Numerical Method for Comparison on Homomorphically Encrypted Numbers", IACR, Asiacrypt 2019 Conference Paper, Nov. 22, 2019, 31 Pages.
Ding, Yuanchao et al., "East: Efficient and Accurate Secure Transformer Framework for Inference", arXiv:2308.09923v1 [cs.CR], Aug. 19, 2023, 9 pages.
Lee, Joon-Woo et al., "Privacy-Preserving Machine Learning with Fully Homomorphic Encryption for Deep Neural Network", arXiv:2106. 07229v1 [cs.LG], Jun. 14, 2021, 12 pages.
Zimerman, Itamar, "Converting Transformers to Polynomial Form for Secure Inference Over Homomorphic Encryption", arXiv:2311. 08610v1 [cs.LG], Nov. 15, 2023, 13 pages.

* cited by examiner

300

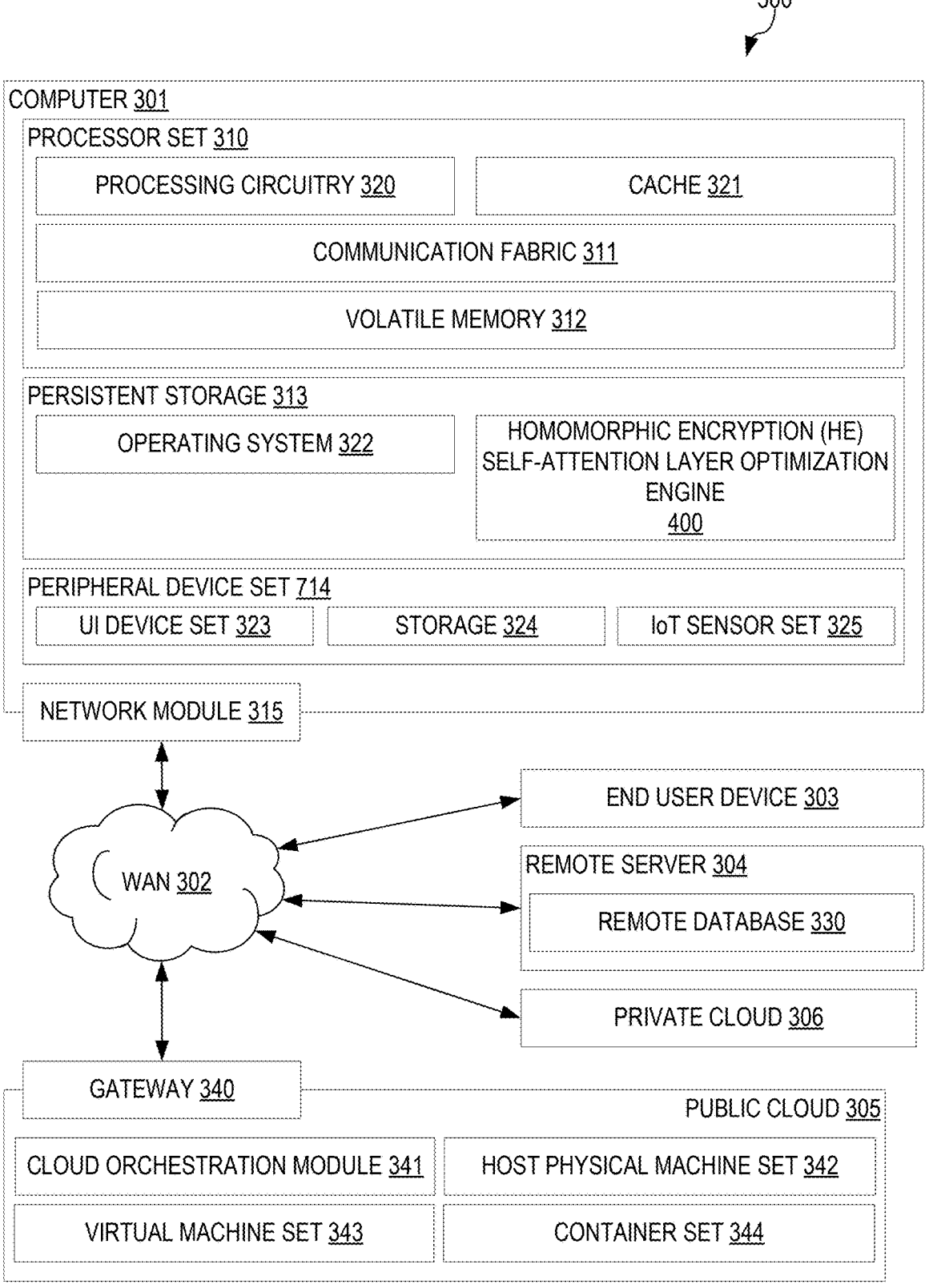

COMPUTER 301

PROCESSOR SET 310

PROCESSING CIRCUITRY 320

CACHE 321

COMMUNICATION FABRIC 311

VOLATILE MEMORY 312

PERSISTENT STORAGE 313

OPERATING SYSTEM 322

HOMOMORPHIC ENCRYPTION (HE) SELF-ATTENTION LAYER OPTIMIZATION ENGINE 400

PERIPHERAL DEVICE SET 714

UI DEVICE SET 323

STORAGE 324

IoT SENSOR SET 325

NETWORK MODULE 315

WAN 302

END USER DEVICE 303

REMOTE SERVER 304

REMOTE DATABASE 330

PRIVATE CLOUD 306

GATEWAY 340

PUBLIC CLOUD 305

CLOUD ORCHESTRATION MODULE 341

HOST PHYSICAL MACHINE SET 342

VIRTUAL MACHINE SET 343

CONTAINER SET 344

*FIG. 3*

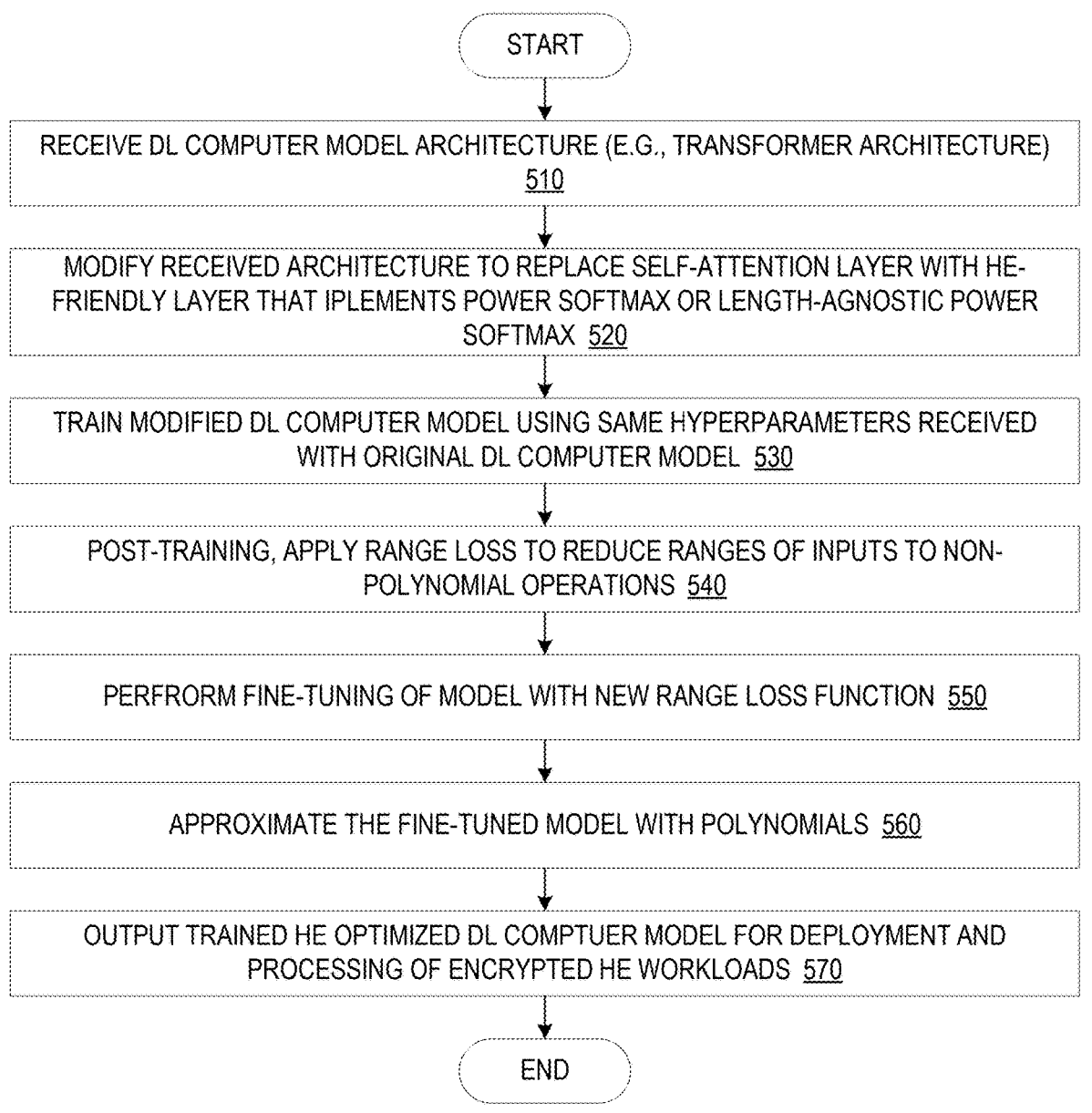

START

RECEIVE DL COMPUTER MODEL ARCHITECTURE (E.G., TRANSFORMER ARCHITECTURE) 510

MODIFY RECEIVED ARCHITECTURE TO REPLACE SELF-ATTENTION LAYER WITH HE-FRIENDLY LAYER THAT IPLEMENTS POWER SOFTMAX OR LENGTH-AGNOSTIC POWER SOFTMAX 520

TRAIN MODIFIED DL COMPUTER MODEL USING SAME HYPERPARAMETERS RECEIVED WITH ORIGINAL DL COMPUTER MODEL 530

POST-TRAINING, APPLY RANGE LOSS TO REDUCE RANGES OF INPUTS TO NON-POLYNOMIAL OPERATIONS 540

PERFRORM FINE-TUNING OF MODEL WITH NEW RANGE LOSS FUNCTION 550

APPROXIMATE THE FINE-TUNED MODEL WITH POLYNOMIALS 560

OUTPUT TRAINED HE OPTIMIZED DL COMPTUER MODEL FOR DEPLOYMENT AND PROCESSING OF ENCRYPTED HE WORKLOADS 570

END

*FIG. 5*

SELF-ATTENTION IN HOMOMORPHIC ENCRYPTION DEEP LEARNING ARCHITECTURES

BACKGROUND

The present application relates generally to an improved data processing apparatus and method and more specifically to an improved computing tool and improved computing tool operations/functionality for efficient self-attention in homomorphic encryption deep learning architectures.

Cybersecurity is a critical issue in modern computer environments. Each day, new reports are made of attackers breaching computer security measures and gaining access to private or confidential data, such as customer names, contact information, financial information, and the like. Moreover, increasing numbers of events are occurring where attackers infiltrate computing systems and hold the computing system or access to data hostage until a ransom is paid. Thus, improvements to the security of computing systems and data are an ever changing area of technology.

Security of data is especially a concern as individuals and organizations move from an on-site computing infrastructure and local applications/data based architecture to a more distributed and cloud infrastructure/service based architecture where third parties are enlisted to perform processing of individual/organization data. At various points in the cloud architecture, e.g., if a cloud architecture performs data processing on unencrypted data, i.e., "in the clear", sensitive information may be leaked. This can be a significant issue as increasing individuals and organizations rely increasingly on cloud architectures.

Homomorphic encryption (HE), or fully homomorphic encryption (FHE) mechanisms, offer tools to help ensure security of data when using off-site, e.g., cloud based, services to perform operations on the data. HE provides mechanisms to perform certain operations on encrypted data without having to have access to the plaintext of the data. With HE, the results of the operations are left in an encrypted form which, when decrypted, result in an output that is identical to that produced had the operations been performed on unencrypted data. Additionally. HE provides mechanisms to perform computations with models using encrypted weights over plain or encrypted data, allowing organizations to protect their models and, consequently, their data or training procedures and other intellectual property.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for optimizing a deep learning (DL) computer model for homomorphic encryption (HE) workload processing. The computer-implemented method comprises receiving an original DL computer model architecture that is to be optimized for HE workload processing, and modifying the original DL computer model architecture by replacing a self-attention layer of the original DL computer model with an HE friendly self-attention layer that comprises a Power SoftMax function that does not have exponent terms, to thereby generate a modified DL computer model architecture. The computer-implemented method further comprises executing a machine learning training of the modified DL computer model architecture. Moreover, the computer-implemented method comprises approximating one or more elements of the Power SoftMax function with polynomials to generate a trained HE optimized DL computer model, and outputting the trained HE optimized DL computer model for execution on HE workloads.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram of a distributed data processing system environment in which aspects of the illustrative embodiments may be implemented and at least some of the computer code involved in performing the inventive methods may be executed;

FIG. 5 is a flowchart outlining an example operation for modifying an example transformer-based deep learning architecture for efficient implementation of a SoftMax layer for homomorphic encryption in accordance with one illustrative embodiment.

DETAILED DESCRIPTION

Figure 1A:
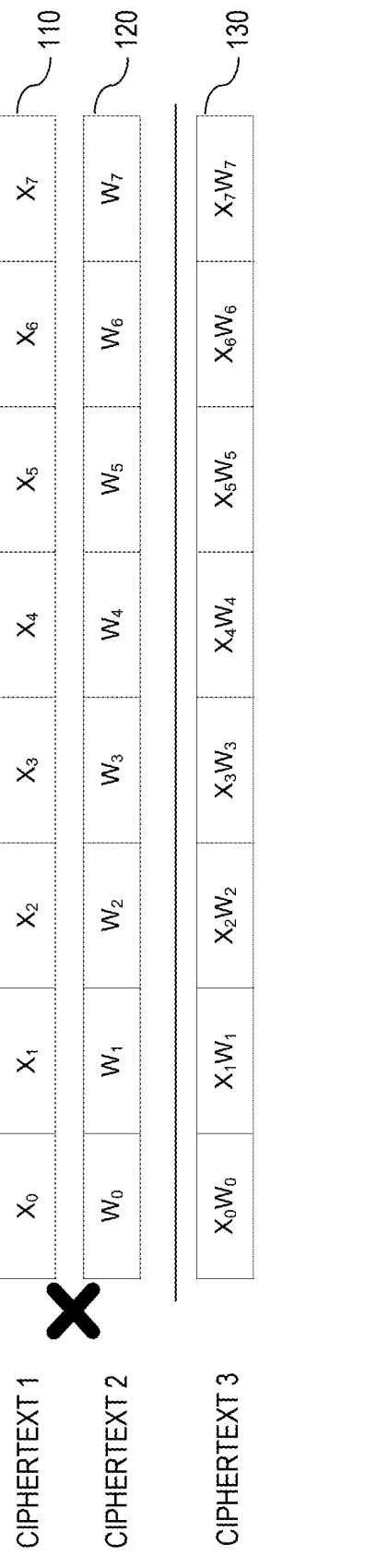
FIGS. 1A and 1B are diagrams illustrating slot-wise operations performed on example ciphertexts in a scheme that supports single-instruction-multiple-data (SIMD)

The illustrative embodiments provide an improved computing tool and improved computing tool operations/functionality for efficient self-attention in homomorphic encryption deep learning architectures, for example transformer-based deep learning architectures. The transformer-based deep learning architecture is one of the most popular architectures for deep learning computer models presently. It should be appreciated that while examples of the illustrative embodiments will be described with regard to a transformer-based deep learning architecture herein, the illustrative embodiments are not limited to such and may be implemented with regard to any suitable deep learning architecture of a desired implementation without departing from the spirit and scope of the present invention.

An important component of the deep learning architectures, such as the transformer-based deep learning architecture, is the self-attention component, which is built on top of the SoftMax function. Self-attention represents a significant shift in how neural networks process and interpret data. Self-attention allows individual segments (also called tokens) of a neural network to dynamically and differentially weigh the importance of various parts of the input, leading to a more context-aware and nuanced understanding. In essence, self-attention computes the response at a position in a sequence by attending to all positions and aggregating their features. This may be expressed as:

$$\text{Attention}(Q, K, V) = \text{SoftMax}((QK^T)/sqrt(dk))V \quad (1)$$

where Q, K, and V represent the query, key, and value matrices, respectively, T represents the matrix transpose, and dk is the dimensionality of the keys. Deep Learning (DL) computer models, such as transformer models, leverage this self-attention mechanism as a core building block, with these DL computer models dominating applications across various domains due to their versatility and effectiveness in handling complex tasks. Many large scale and foundational artificial intelligence (AI) computer models and systems utilize such Transformer DL computer models, including Generative Pre-trained Transformer 3 (GPT-3), Vision Transformer (ViT), Large Language Model Meta AI (LLaMA), and the like.

A homomorphic encryption (HE) or fully homomorphic encryption (FHE) system is a cryptographic system that allows its users, e.g., clients, to evaluate any "circuit" on encrypted data using the four methods (described in greater detail below): Gen, Enc, Dec, Eval. The "circuit" is the group of computations or calculations that are to be performed on the encrypted data using HE of FHE. That is, for example, one may want to perform a particular operation on input data, where this operation may require a plurality of HE computations to be performed in series and/or parallel to ultimately generate one or more results corresponding to the requested operation. These HE computations may be represented as a graph of nodes and edges proceeding from inputs to one or more outputs with intermediate nodes and intermediate ciphertexts being generated as a result of the HE computations performed at the various stages along the graph. For example, edges in a graph may represent HE computations and nodes in the graph may represent ciphertexts. The combination of these nodes and edges may be considered a "circuit" that defines the various HE input ciphertext(s), the intermediate ciphertext(s), and the output ciphertext(s). These combinations of HE compute operations and resulting ciphertext(s) are referred to as a circuit as the operations of a circuit are not dependent on the particular inputs, e.g., there are no conditional operations, as the inputs are encrypted, and are performed on the inputs to the circuit, similar to classic electrical circuits.

With an HE scheme, a client, e.g., a user of a computing device, a computing process executing on a computing device, or the like (hereafter simply a "client"), can use the key generation method (Gen) to generate a pair of secret and public keys (sk, pk), where the "client" is a client to a HE service provider that provides an HE service, such as a cloud computing HE service or the like, via one or more computing systems, e.g., servers. The client stores the secret key (sk) and publishes the public key (pk).

Using the public key (pk), an untrusted entity can encrypt sensitive data (or a "message") $m_i$ by calling the encryption method (Enc), e.g., $c_i=\text{Enc}_{pk}(m_i)$. Subsequently, the client can ask the untrusted entity to execute the function $c_{res}=\text{Eval}_{pk}(f,(c_1, \ldots, c_n))$ in order to evaluate a function f on some ciphertexts $c_i$ and store the results in another results ciphertext $c_{res}$. To decrypt $c_{res}$ using the secret key (sk), the client calls the decryption method (Dec), e.g., $m_{res}=\text{Dec}_{sk}(c_{res})$, where $m_{res}$ is the resulting decrypted message corresponding to the ciphertext $c_{res}$ which has been decrypted using the secret key (sk). A HE scheme is correct when f(m)=Dec(Enc(m)) and is approximately correct when m=Dec(Enc(m))+epsilon, for some relatively small epsilon. The "Eval" receives an HE circuit and ciphertext(s) and evaluates the circuit with the given ciphertext(s) as inputs as to whether they are correct or not.

Some HE schemes operate on ciphertexts in a homomorphic single instruction multiple data (SIMD) fashion. This means that a single ciphertext encrypts a fixed-size vector, and the homomorphic operations on the ciphertext are performed slot-wise on the elements of the plaintext vector, where "slot-wise" refers to each of the vector slots of the vector and means that the operations are performed on a vector slot by vector slot basis. For example, as shown in FIG. 1A, a first ciphertext 110 may be packed with a first vector of elements in one ciphertext, i.e., x0 to x7, where each element is in a vector slot. Similarly, a second ciphertext 120 may be packed with a second vector of elements in one ciphertext, i.e., w0 to w7. In the context of an HE operation, these elements are encrypted data. Addition and multiplication operations, for example, may then be performed on these ciphertext in a slot-wise manner so as to generate a result ciphertext 130, in which each vector slot of the ciphertext 130 comprises the product or sum of the corresponding vector slots of the first and second ciphertexts 110-120.

Figure 1B:
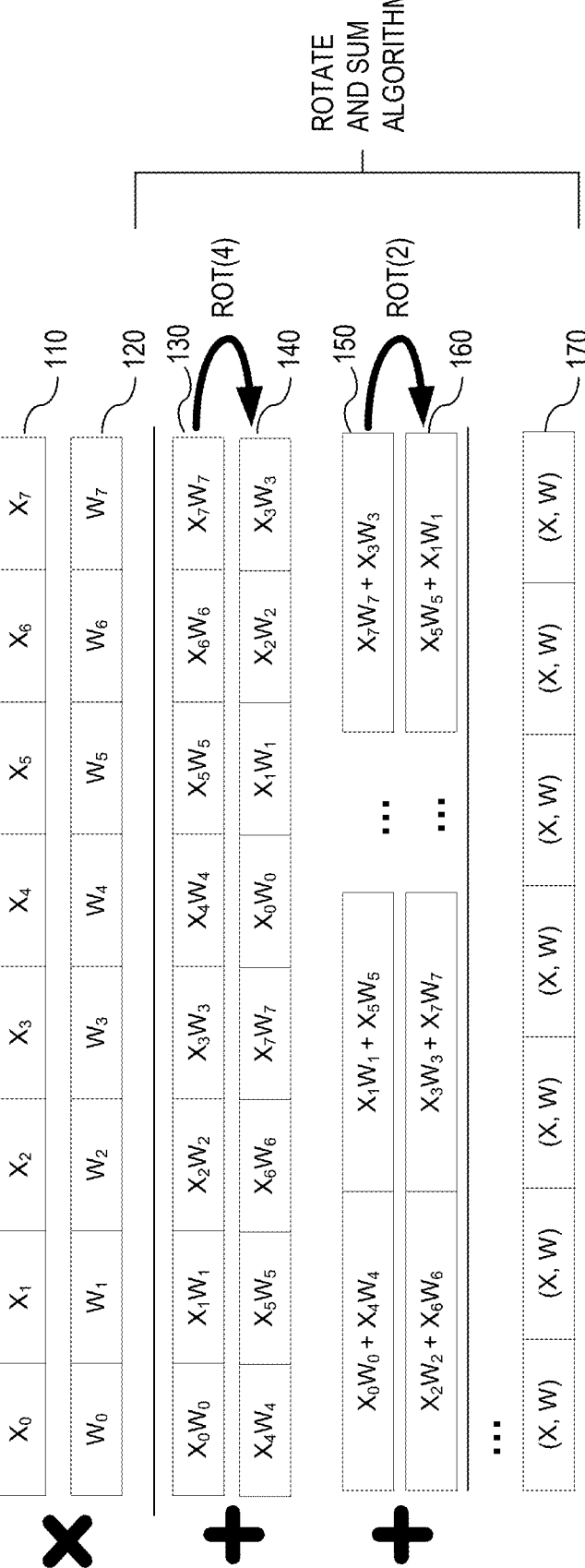

Other operations may be achieved by a combination of multiplication and addition operations with some rotation operations. Rotation operations rotate the vector slots by a specified number of vector slots, wrapping at the ends of the vectors. FIG. 1B illustrates a rotate and sum algorithm that is performed on the result vector 130 generated from the multiplication of the first and second ciphertexts (or vectors) 110-120. An operation such as that shown in FIG. 1B, may be used, for example, to obtain an inner product of the two ciphertexts 110-120. As shown in FIG. 1B, after obtaining the result ciphertext (or vector) 130 in the manner shown in FIG. 1A, a rotation of 4 slots, i.e., Rot(4), to obtain the rotated ciphertext 140 which is then added to the result ciphertext 130. Thereafter, a rotation operation of 2 slots is performed on the result ciphertext 150 to generate the rotated ciphertext 160 which is then added to the result ciphertext 150. These are referred to as rotate and sum (RaS) algorithms, and will ultimately result in an output ciphertext 170 which may represent, for example, an inner product of the original input ciphertexts 110-120.

Merging HE/FHE schemes with DL computer models, e.g., Transformer computer models, would allow HE/FHE protections to be applicable to complex tasks performed by these DL computer models such that the power of the DL computer models may be employed on encrypted inputs and generate encrypted outputs without having to expose the decrypted plaintext data. For example, such DL computing models, e.g., Transformers, may perform HE computations on encrypted inputs at each layer of the DL computer model and generate encrypted outputs representing corresponding classifications or probabilities based on the training of the DL computer model. Furthermore, transformers can also be used as generative models, and the output of the DL model can be an image, a sentence, or other forms of data samples.

Figure 2:
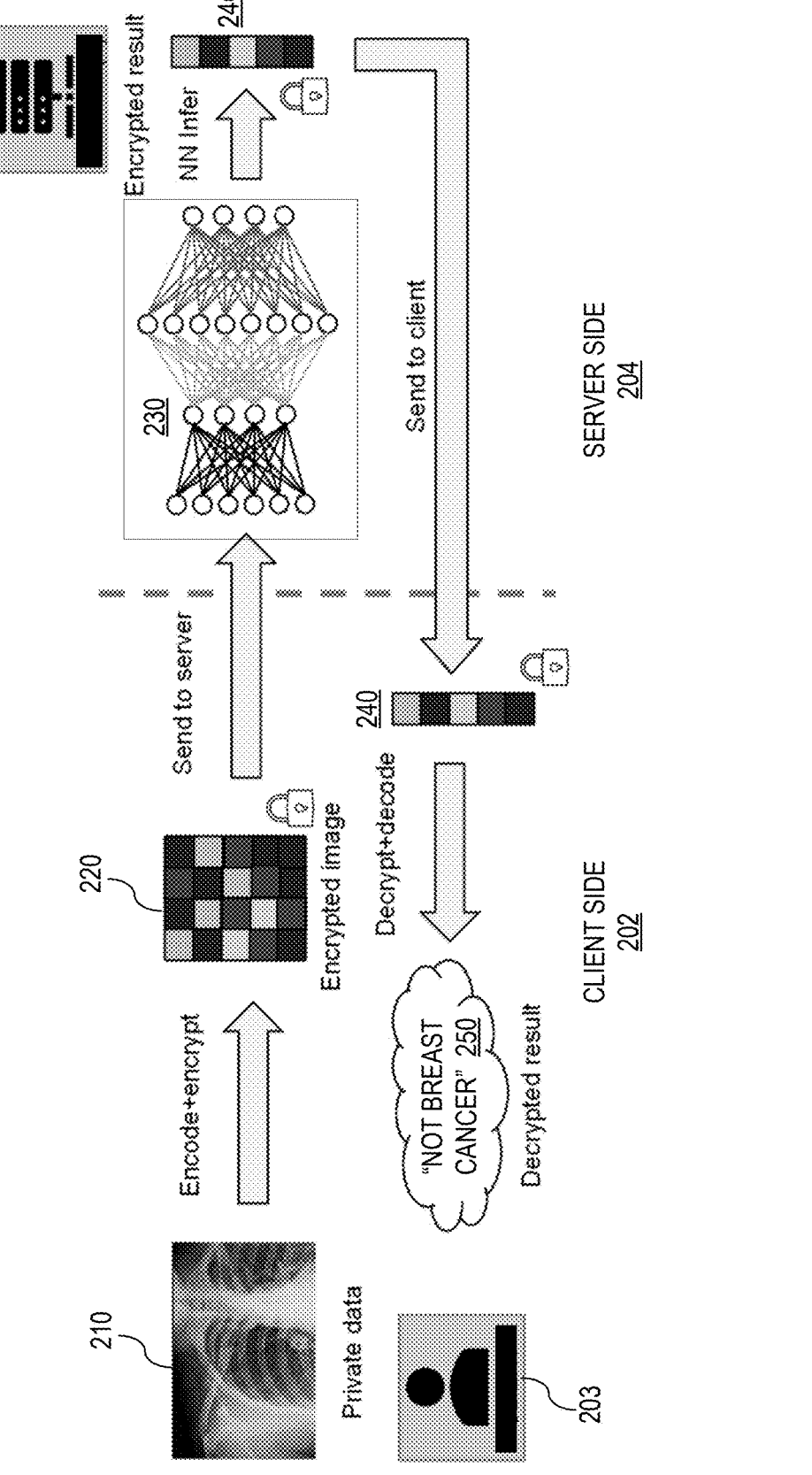
FIG. 2 is an example diagram of a homomorphic encryption (HE) operation in accordance with one illustrative embodiment.

FIG. 2 is an example diagram of a homomorphic encryption (HE) operation in accordance with one illustrative embodiment. As shown in FIG. 2, on a client side 202 of the HE operation, the client computing device 203 has private data 210, e.g., a medical image or the like, upon which the operator of the client computing device 203 wants an HE operation to be performed, e.g., a classification of the medical image with regard to anomalies or the like. In order to preserve the privacy of the private data 210, the client computing device encodes and encrypts the private data 210 to generate an encrypted image 220. The encrypted image 220 is then transmitted via one or more data networks (not shown) to the server side 204 of the HE operation, implemented on one or more server computing devices 205.

At the server side 204, one or more artificial intelligence (AI) or machine learning computer models 230, e.g., DL computer model(s), Transformer DL computer models (or simply Transformers), etc., are used to process the encrypted image data 220 using HE computations to thereby infer an encrypted result 240, e.g., a classification of the encrypted image 220. This is done without decrypting the encrypted image 220, and thus the privacy of the original private data 210 is preserved. The encrypted result 240 is returned to client computing device 203 of the client side 202, which then decrypts and decodes the encrypted result 240 to obtain the plaintext result 250. For example, in this case, the medical image 210 may be evaluated to determine the presence of an anomaly or that the medical image does not have indications of the anomaly, e.g., breast cancer or the like.

While HE operations may be performed using such DL computer model(s) or Transformers, as noted above, self-attention mechanisms are a required aspect of these DL computing models/Transformers, and such self-attention mechanisms do not lend themselves to being performed efficiently in HE environments on HE workloads. That is, efficiently computing self-attention in HE/FHE systems presents a significant challenge due to the non-polynomial nature of the SoftMax function used by these self-attention mechanisms. The SoftMax function is a function that coverts a vector of real numbers into a vector of real values that add up to 1 and can be interpreted as probabilities. The SoftMax function transforms the input values (e.g., 1, 2, 3, 4, 1, 2, 3) into values between 0 and 1, e.g., (0.024, 0.064, 0.175, 0.475, 0.024, 0.064, 0.175), by using exponential and division functions which are non-polynomial. HE and FHE systems do not support such exponentiation, division, or non-polynomial operations and instead are limited to poly-nomial operations, such as addition, subtraction, and multiplication. Thus, computing the attention in HE and FHE systems is difficult due to the self-attention mechanisms being based on the SoftMax function, or similar function, which is not polynomial and includes division and expo-nentiation.

One way in which the SoftMax function may be handled in a HE environment is to directly approximate the SoftMax function with polynomials. For instance, one may compute a weighted sum as an approximation. However, this does not work well as the approximation is not very accurate.

Another way to handle the SoftMax function is to replace the SoftMax function with polynomial functions or alterna-tive activation functions. While this may attempt to address the non-polynomial nature of SoftMax, such replacements result in mechanisms that are less efficient ($L^2$ polynomials instead of L) and which are less effective, i.e., they have a negative impact on the training stability and require more polynomial approximations. Specifically, it has been shown that the SoftMax function, which operates over vectors, can be replaced by an activation function that is augmented to operate on vectors. For example, the ReLU function (which is a scalar function) can process the vector as follows: ReLU $(x_1, x_2, \ldots, x_L)$=ReLU $(x_1)$, ReLU$(x_2)$, ..., ReLU $(x_L)$. However, this mechanism requires using L polynomials instead of the single polynomial used in the illustrative embodiments described herein (only one division per vec-tor). Additionally, empirical evidence shows that replacing the entire SoftMax function with a polynomial creates instabilities during training and makes it infeasible to train transformers that are not very small.

Thus, there is a need to be able to perform or approximate the SoftMax function in such a manner as to make HE or FHE computation of the attention for self-attention mecha-nisms of a DL computer model, e.g., Transformer, plausible and efficient and address the drawbacks of the other solu-tions noted above. The illustrative embodiments provide a solution to these issues by providing an improved computing tool and improved computing tool operations/functionality to transform the SoftMax layer of a DL computer model into a HE/FHE friendly variant of the self-attention layer or SoftMax layer that may be efficiently implemented using HE/FHE computations. The illustrative embodiments, instead of directly approximating the SoftMax function with polynomials, instead defines a new computer functionality, referred to herein as the Power SoftMax computer function-ality, that possesses properties similar to SoftMax, e.g., super-linear scaling and 0-1 normalization, but which is easier to approximate using polynomials and also ensures numerical stability during training. As a result, a perfor-mance equivalent to the SoftMax function is achieved, but which can be efficiently computed in HE environments.

In addition, the illustrative embodiments provide an improved computing tool and improved computing tool operations/functionality that transforms the SoftMax layer, i.e., self-attention layer, of a DL computer model architec-ture into a HE/FHE friendly self-attention layer while mini-mizing the multiplication depth of the HE/FHE friendly self-attention layer. Multiplication depth, in the context of HE/FHE operations (hereafter simply referred to as "HE" operations or computations) is an important parameter that refers to the maximum number of sequential multiplications that can be performed on encrypted data before decryption becomes infeasible. This concept is important to HE opera-tions because each operation on encrypted data, especially multiplication, increase the noise level in the ciphertext, where the "noise" is a small term added into the ciphertext while encrypting to guarantee the security of the cryptosys-tem, but if the "noise" value is greater than a maximum, the decryption function will not work correctly. HE schemes can only handle a certain amount of noise before a costly bootstrap operation (an operation to refresh ciphertexts is required in order to continue with the computation) or decryption results becomes too corrupted to be useful. Multiplication operations on ciphertexts as part of an HE scheme can increase the amount of "noise" in the ciphertexts and thus, one goal is to decrease the overall multiplication depth and the number of multiplications.

The improved computing tool and improved computing tool operations/functionality of the illustrative embodiments provides an alternative to the SoftMax or self-attention mechanisms in DL computer model architectures, such as a Transformer, where this alternative is specifically optimized for HE environments. The HE optimized self-attention layer of the illustrative embodiments comprises the Power Soft-Max functionality which is an optimization of the SoftMax function achieved by replacing exponentiation (which are non-polynomials) with powers (which are polynomials) before the training phase of the DL computer model, rather than attempting to directly approximate the SoftMax function by polynomials. A "power" is a quantity that specifies a base value and an exponent, where the exponent specifies how many times to use the corresponding base value in multiplication, e.g., x'' where n is the "power", means that the value of x is used n times. The use of powers can decrease training stability, however. Therefore, the Power SoftMax function of the HE optimized self-attention layer of the illustrative embodiments implements a numerically stable variation of the attention mechanism which can be efficiently approximated using polynomials post-training.

With the mechanisms of the illustrative embodiments, given a DL computer model architecture, e.g., a Transformer architecture, involving multiple layers with at least one SoftMax or self-attention layer, the illustrative embodiments modify the architecture to replace the existing SoftMax or self-attention layer with an alternative HE optimized self-attention layer comprising the Power SoftMax function. The replacement of the SoftMax or self-attention layer in the given architecture involves replacing exponentiation in the SoftMax function with powers before training the DL computer model. The Power SoftMax function implemented in the replacement layer is stable and employs an approximation over a scale-agnostic range, as described hereafter. When the DL computer model is trained, the Power SoftMax based layer of the modified DL computer model performs comparably to the original SoftMax based layer on complex tasks.

Once the modified DL computer model is trained, in a post-training operation, the objective is to approximate division in the Power SoftMax function of the modified DL computer model with polynomials. With the mechanisms of the illustrative embodiments, the stable and scale agnostic Power SoftMax function is defined such that the denominator of the division in the function has a scale that is independent of sequence length and thus, the division operation may be performed once per row in an attention matrix. In particular, as both $x^p$ and $\exp(x)$ are positive for any x values, both sums of $(x_1)^p + \ldots + (x_L)^p$ and $\exp(x_1) + \ldots + \exp(x_L)$ are positive and increase linearly with the sequence length L (since this is a sum over L positive terms) and can be very large for lengthy sequences. This sum may be denoted as $S_L$, and instead of dividing by $S_L$, the illustrative embodiments first divide by $S_L/L$ (the mean instead of the sum), which does not increase linearly with L. The division is approximated over $M_L = S_L/L$ instead of $S_L$, leveraging the fact that L is known in advance, and it is not encrypted. The illustrative embodiments can compute $1/S_L = L/M_L$, which involves the approximation of $1/M_L$, which does not increase linearly with L. The resulting polynomial approximation problem is much easier, leading to a low-degree polynomial that improves accuracy and latency by decreasing the multiplication depth.

Thus, the Power SoftMax function replaces exponentiation with powers prior to training the DL computer model, and then the Power SoftMax function may be approximated efficiently in a scale agnostic manner using polynomials after training of the DL computer model. As a result, the illustrative embodiments provide an improved computing tool and improved computing tool operations/functionality that enables the computation of DL computer models, e.g., Transformers, within HE environments. The illustrative embodiments do so while achieving performance comparable to other attention mechanisms, but also providing efficient computation over HE. For example, for sequences of L tokens, the illustrative embodiments require only L approximations since the illustrative embodiments apply Power SoftMax to L vectors, and the Power SoftMax includes only 1 division operation, given that the division operation in the Power SoftMax function can be applied once per row in the attention matrix. Moreover, since the division involves a restricted denominator which is positive, it results in relatively low-rank polynomials, enhancing the computation efficiency, as discussed in more detail hereafter.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides for optimization of the self-attention layer, or SoftMax layer, of a given Deep Learning (DL) computer model architecture for Homomorphic Encryption (HE), by modifying the self-attention or SoftMax layer to implement an alternative Power SoftMax function of the illustrative embodiments. The improved computing tool implements mechanism and functionality, such as a HE self-attention layer optimization engine, which cannot be practically performed by human beings either outside of, or with the assistance of, a technical environment, such as a mental process or the like. The improved computing tool provides a practical application of the methodology at least in that the improved computing tool is able to modify and optimize a given DL computer model architecture, such as a Transformer architecture, so that it may be efficiently used to perform HE operations, especially with regard to the self-attention or SoftMax layer of these architectures.

FIG. 3 is an example diagram of a distributed data processing system environment in which aspects of the illustrative embodiments may be implemented and at least some of the computer code involved in performing the inventive methods may be executed. That is, computing environment 300 contains an example of an environment for the execution of at least some of the computer code involved in performing the inventive methods, such as Homomorphic Encryption (HE) self-attention layer optimization engine 400. In addition to HE self-attention layer optimization engine 400, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and HE self-attention layer optimization engine 400, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/ or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in HE self-attention layer optimization engine 400 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface type operating systems that employ a kernel. The code included in HE self-attention layer optimization engine 400 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

As shown in FIG. 3, one or more of the computing devices, e.g., computer 301 or remote server 304, may be specifically configured to implement a HE self-attention layer optimization engine 400. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 301 or remote server 304, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates modification and optimization of Deep Learning computer model architectures, e.g., Transformer architectures, for specific implementation with regard to Homomorphic Encryption (HE) or Fully Homomorphic Encryption (FHE) operations by specifically modifying the self-attention layer or SoftMax layer of these architectures to implement a stable and scale agnostic Power SoftMax function which replaces exponentiation with powers prior to training of the modified DL/Transformer computer model, and then permits efficient polynomial approximation of the Power SoftMax function after training of the modified DL/Transformer computer model.

Figure 4:
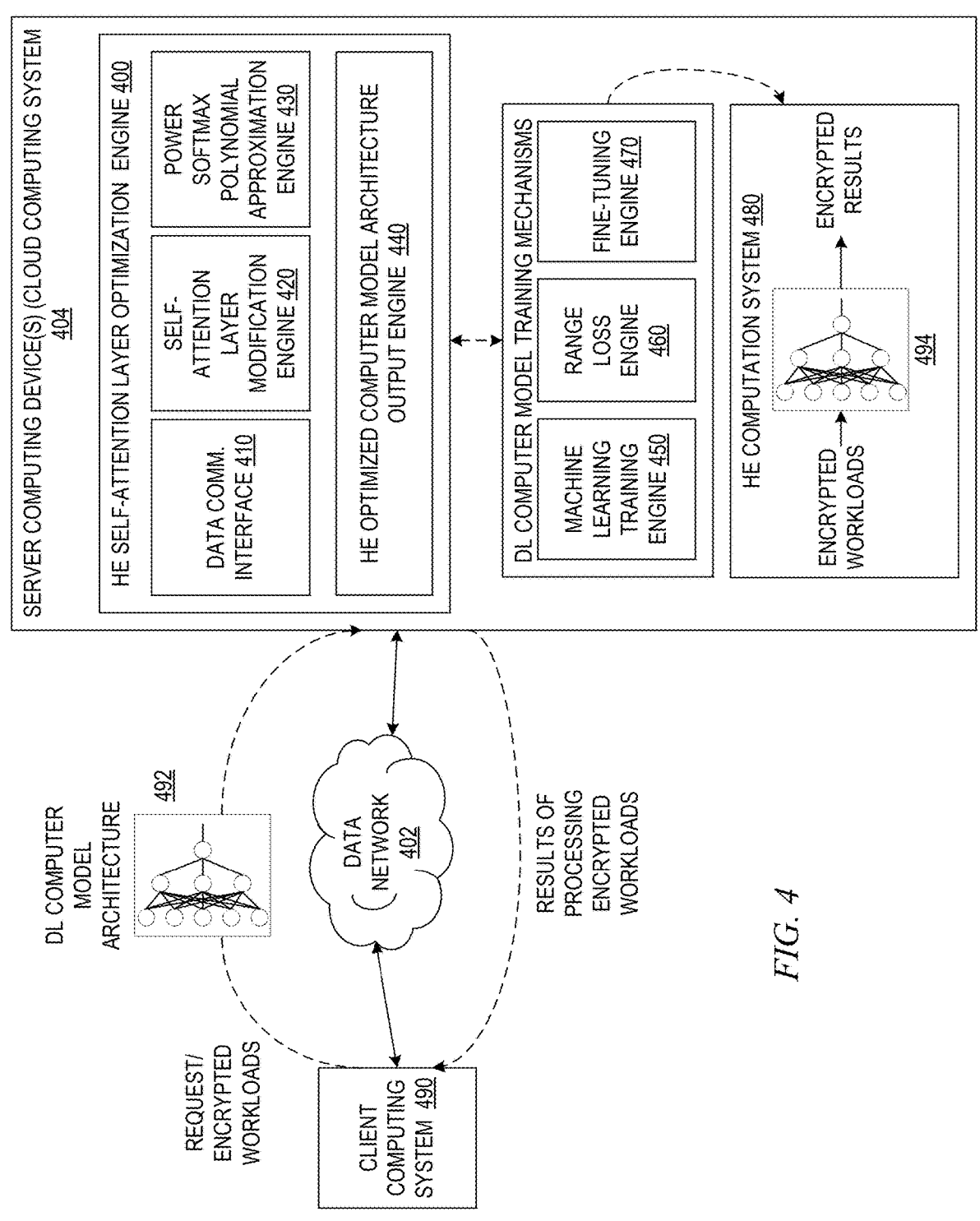
FIG. 4 is an example diagram of a homomorphic encryption deep learning architecture modification system in accordance with one illustrative embodiment.

FIG. 4 is an example diagram of a Homomorphic Encryption (HE) self-attention layer optimization engine in accordance with one illustrative embodiment. The operational components shown in FIG. 4 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., a given deep learning architecture for a HE operation, and the resulting output may aid human beings, e.g., homomorphic encryption operation results. The invention is specifically directed to the automatically operating computer components directed to improving the way that Deep Learning (DL) computer model architectures, such as Transformers, are able to perform SoftMax functions specifically by modifying the SoftMax layer of the DL computer model architectures to replace non-polynomial based operations with polynomial based operations that can be more efficiently performed by homomorphic encryption and doing so in a way that is scale agnostic. This cannot be practically performed by human beings as a mental process and is not directed to organizing any human activity.

As shown in FIG. 4, the HE self-attention layer optimization engine 400 comprises a data communication interface 410, a self-attention layer modification engine 420, a Power SoftMax polynomial approximation engine 430, and an HE optimized computer model architecture output engine 440. The HE self-attention layer optimization engine 400 may work in conjunction with other DL computer model training mechanisms, such as a machine learning training engine 450 or fine-tunning engine 470, and can include several loss functions (such as weight decay and label smoothing) and other regularization methods tailored for HE-based models, such as a range loss engine 460 which encourages the model to use small ranges that are easier to approximate post-training. These DL computer model training mechanisms operate to train a HE optimized DL computer model for runtime processing of encrypted HE workloads submitted by one or more client computing systems and providing encrypted results back to these client computing systems.

The HE self-attention layer optimization engine 400 and DL computer model training mechanisms 450-470 may be provided, for example, as a cloud computing service, as part of a cloud infrastructure, or the like, which provides HE/FHE computation capabilities on behalf of client computing systems, such as client computing system 490 in FIG. 4. While a cloud computing implementation is depicted in FIG. 4, it should be appreciated that the illustrative embodiments are not limited to such, and the mechanisms of the illustrative embodiments may be implemented in a single computing system comprising one or more computing devices, or distributed across multiple computing systems in communication with one another via one or more data networks 402 but not necessarily as a cloud computing implementation, e.g., a traditional client-server configuration that is a non-cloud computing implementation.

The HE self-attention layer optimization engine 400 and DL computer model training mechanisms 450-470 may operate in conjunction with other HE mechanisms, such as HE computation system 480, to process HE workloads comprising encrypted data and provide encrypted results back to client computing systems, e.g., see the example of FIG. 2 above. For example, the HE self-attention layer optimization engine 400 may perform operations to modify a given DL computer model architecture so as to modify and optimize the self-attention layer for HE computations, the DL computer model training mechanisms 450-470 may operate to train and fine-tune the modified DL computer model architecture so that it is trained for processing runtime encrypted HE workloads, and the resulting trained DL computer model may be deployed to the HE computation system 480 to perform appropriate HE computations on runtime encrypted HE workloads and provide encrypted results back to the client computing system 490.

Thus, the HE self-attention layer optimization engine 400 provides capabilities for modifying a given DL computer model, e.g., Transformer computer model, architecture 492 so that it may be efficiently implemented for HE computing operations, given the above described limitations of self-attention mechanisms and HE schemes. Thus, a client computing system 490 may, as part of an initialization process, registration process, or the like, provide a DL computer model architecture 492 along with other configuration information, training data, and the like, for instantiation of a DL computer model at the server side implemented HE cloud service. For example, a client computing system 490 may perform data communications with the cloud computing system 404, which comprises one or more computing devices, storage devices, data communication devices, and the like, to provide cloud services, infrastructure, and/or storage on behalf of client computing systems.

In particular, the client computing system 490 may submit requests to the cloud computing system 404 to implement a DL computer model corresponding to the given architecture 492 and configured for a specific type of HE workload. Configuration information for the DL computer model may be provided, training data may be provided for training the DL computer model, and the like. The cloud computing system 404 may implement the HE self-attention layer optimization engine 400, in conjunction with other the DL training mechanisms 450-470 to modify and train the DL computer model architecture for the requested HE computations. In so doing, the HE self-attention layer optimization engine 400 operates to replace the self-attention layer of the given DL computer model architecture, e.g., architecture 492 in FIG. 4, with an HE optimized self-attention layer that implements a Power SoftMax function in accordance with the illustrative embodiments.

The data communication interface 410 of the HE self-attention layer optimization engine 400 provides a data communication pathway through which the HE self-attention layer optimization engine 400 may communicate with the client computing system 490 and/or other components of the cloud computing system 404. Thus, information from the original request from the client computing system 490 may be provided to the HE self-attention layer optimization engine 400 via this data communication interface 410 and resultant data, e.g., the trained and optimized DL computer model architecture, may be communicated to other computing devices and components. For example, the trained and optimized DL computer model architecture 494 having the HE self-attention layer replacement that implements the Power SoftMax of the illustrative embodiments, may be communicated to an HE computation system 480, which may be part of the same cloud computing system 404 (as shown) or part of a separate computing system.

To further illustrate the modifications of the DL computer model architecture 492 made by the HE self-attention layer optimization engine 400, it will be assumed for illustration purposes that the architecture is that of a Transformer computer model. Transformers rely on self-attention, a neural layer that is formalized by:

$$SelfAttention\,(Q,K,V) := \mathrm{Softmax}\!\left(\frac{QK^{T}}{\sqrt{d_k}}\right)\!V \qquad (2)$$

$$\text{Given a vector } X := (x_1, x_2, \ldots, x_L),\ \mathrm{Softmax}(X)_i = \frac{e^{x_i}}{\sum_{j=1}^{L} e^{x_j}} \qquad (3)$$

where Q, K, and V again represent the query, key, and value matrices, respectively, and $d_k$ is the dimensionality of the keys, where L is the sequence length $(x_1, x_2, \ldots, x_L)$, and T is the transpose operator. It should be noted that sqrt $(d_k)$ is constant which can be computed in advance and thus, would not require a polynomial approximation. As can be seen, there are two non-polynomial functions, L exponents and 1 division per vector, resulting in $L^2$ exponents and L divisions per matrix which have L rows. Exponents $e^x$ and divisions are not polynomial.

Estimating $e^{x_i}$ and $$\sum_{j=1}^{L} e^{x_j}$$

directly involves L invocations of a deep polynomial for $e^x$ and one deep polynomial for 1/x, where a deep polynomial refers to relatively high-degree polynomials (as the degree increases, the multiplication depth increases, and the latency and accuracy become slower and noisier). The deep polynomial for $e^x$ results in very large values, and the resulting 1/X also needs to run on a large domain, such that: (1) 1/x are very hard to estimate in this large domain and (2) $e^i*(1/(\ldots))$ multiplies a large value with a very small value which results in numeric instability.

One practice to overcome this difficulty may be to replace the self-attention SoftMax function with Rectified linear unit (ReLU) function per $X_i$. However, there are problems with this ReLU approach in that the i's are not multivariate and not similar to SoftMax, therefore the resulting accuracy is not as good as with SoftMax. Moreover the ReLU approach requires a deep polynomial. Thus, modern Transformer computer models cannot be directly approximated using polynomials. Additionally, even if this barrier is solved, it will be very costly since there are L ReLU (or any other non-polynomial activation function) operations on each row, resulting in $L^2$ deep polynomials for the entire matrix. Thus, an optimization goal is to minimize the number of operations that are non-polynomial operations by converting these non-polynomial operations into ones that can be easily approximated using polynomials. The illustrative embodiments achieve this optimization goal via a two-step process. In a first step, the number of non-polynomial operations are reduced. In a second step, non-polynomials that can be easily approximated are used.

With regard to the first step, the self-attention layer modification engine 420 of the illustrative embodiments modifies the architecture of a given deep learning computer model architecture, e.g., a Transformer computer model architecture, 492 to replace the self-attention layer with a HE optimized self-attention layer that implements a Power SoftMax function that replaces exponents with powers such that the self-attention layer function does not have exponents, i.e., $e^x$:

$$SelfAttention\,(Q,K,V) := PowerSoftmax\!\left(\frac{QK^{T}}{\sqrt{d_k}}\right)\!V \qquad (4)$$

$$PowerSoftmax(X)_i = \frac{x_i^p}{\sum_{j=1}^{L} x_j^p},\ \text{for some even } p. \qquad (5)$$

Both of the SoftMax and Power SoftMax functions produce values between 0 and 1 that sum up to 1.0, similar to probabilities. However, in contrast to the SoftMax function which relies on exponents and is monotonically increasing, i.e., $x^p$ (for positive p) in the Power SoftMax function is monotonically increasing for positive values of x. Thus, Power SoftMax provides a performance similar to SoftMax due to its super-linear scaling, normalization of unbounded values to be between 0 and 1, which sums up to 1.0 like probabilities, and its monotonic increase in terms (for x, or norm (x)).

Approximating the division, i.e., $$f(x) = \frac{1}{x}$$

is relatively hard to do, in particular, around x=0, where $$\frac{1}{x} \to 0.$$

However, the rower Softmax function only deals with positive values since p is even. The main problem, however, is that the size of $$\sum_{j=1}^{L} x_i^p$$

varies, and increases linearly with L. Thus, in accordance with one or more illustrative embodiments, a length-agnostic Power SoftMax function is utilized as follows:

Length-Agnostic $PowerSoftmax(X)_i =$ (6)

$$\frac{x_i^p}{\sum_{j=1}^{L} x_j^p} = \frac{x_i^p}{L} \frac{1}{\underbrace{\frac{\sum_{j=1}^{L} x_j^p}{L}}} = \frac{x_i^p}{L} \frac{1}{mean\left(x_j^p\right)}$$

where 1/L can be computed directly, and not approximated, since L (sequence length) is known and is not encrypted and it can be computed once for all layers, i.e., $$L' = L^{\frac{1}{p}}$$

(pre-computed). That is, the Length-Agnostic Power Soft-Max function provides a function that requires only L computations of simple powers $x^p$ (which are polynomials). Using exponentiation by squaring, these computations can be done in just log (P) SIMD non-scalar products for all the L x's. Moreover, for positive values, there are relatively accurate approximations for 1/x. For example, one invocation of the Goldschmidt operation (see Robert E. Gold-schmidt, "Applications of Division by Convergence", Mass. Inst. of Tech., 1965) for 1/x may be used as this is expo-nentially faster than a deep polynomial for ReLU (log(n) instead of sqrt (2N) where n is the small power, e.g., 6, and N is the higher degree of ReLU, e.g., 30. The numeric stability is improved with the use of L' which involves just one additional scalar product. The obtained approximation results are much more efficient than approximate ReLU, exp, or other similar variants. The overall result is faster and more accurate than the ReLU alternative, and avoids the numerical issues that prohibit the direct estimation of Soft-Max directly.

Thus, with the mechanisms of the illustrative embodi-ments, given a DL computer model architecture 492, e.g., a Transformer architecture, involving multiple layers with at least one SoftMax or self-attention layer, that is to be optimized for HE workloads, the self-attention layer modi-fication engine 420 operates to modify the given architecture 492 to replace the existing SoftMax or self-attention layer with an alternative HE optimized self-attention layer com-prising the Power SoftMax or Length-Agnostic Power Soft-Max function of the illustrative embodiments. The replace-ment of the SoftMax or self-attention layer in the given architecture 492 involves replacing exponentiation in the SoftMax function with powers before training the DL com-puter model, and thus, during training, a HE optimized DL computer model 494 is generated and trained by the DL computer model training mechanisms. Finally, to convert the entire model to polynomial form the machine learning training engine 450, the range loss engine 460, and the fine-tuning engine 470 can be used. The machine learning training engine 450 performs operations to train the HE optimized DL computer model generated by the self-atten-tion layer modification engine 420 using machine learning algorithms and one or more training datasets. The range loss engine 460 implements training procedure that replaces activation functions and layer normalization layers with polynomials, which allows for dealing with non-polynomial components, such as activations like ReLU and GELU, for example. The fine-tuning engine 470 replaces non-polyno-mials with polynomials, e.g., a ReLU may be replaced with a polynomial approximation and then the fine tuning may be used to validate that the communication between all sub-layers is re-established accurately.

When the HE optimized DL computer model (or modified DL computer model) is trained, the Power SoftMax or Length-Agnostic Power SoftMax based layer of the HE optimized (modified) DL computer model performs compa-rably to the original SoftMax based layer on complex tasks. In a post-training operation, the Power SoftMax polynomial approximation engine 430 approximates division in the Power SoftMax or Length-Agnostic Power SoftMax func-tion of the modified DL computer model with polynomials. With the mechanisms of the illustrative embodiments, the resulting stable and scale agnostic Power SoftMax function is defined such that the denominator of the division in the function has a scale that is independent of sequence length and thus, the division operation can be approximated with relatively lower degree polynomials.

Thus, the HE self-attention layer optimization engine 400 operates such that the Power SoftMax function or Length-Agnostic Power SoftMax function replaces the SoftMax function in a manner that replaces exponentiation with powers prior to training the DL computer model, and then the Power SoftMax function may be approximated effi-ciently in a scale agnostic manner using polynomials after training of the DL computer model. As a result, the HE self-attention layer optimization engine 400 of the illustra-tive embodiments provides an improved computing tool and improved computing tool operations/functionality that enables the computation of DL computer models, e.g., Transformers, within HE environments. The illustrative embodiments do so while achieving performance compa-rable to other attention mechanisms, but also providing efficient computation over HE. For example, for sequences of L tokens, the illustrative embodiments require only L low-degree approximations (only L divisions and no expo-nents), given that the division operation in the Length-Agnostic Power SoftMax function can be applied once per row in the attention matrix. Moreover, since the division involves a restricted denominator which is positive, it results in relatively low-rank polynomials, enhancing the compu-tation efficiency, as discussed above.

FIG. 5 is a flowchart outlining an example operation for modifying a deep learning architecture for efficient imple-mentation of a SoftMax layer for homomorphic encryption in accordance with one illustrative embodiment. It should be appreciated that the operations outlined in FIG. 5 are spe-cifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 5, and may, in some cases, make use of the results generated as a consequence of the operations set forth in FIG. 5, the operations in FIG. 5 themselves are specifically performed by the improved computing tool in an automated manner.

As shown in FIG. 5, the operation starts by receiving a DL computer model architecture, e.g., a Transformer architec-ture, which is to be optimized for executed HE workloads (step 510). The received architecture is modified to replace the self-attention layer, e.g., SoftMax layer, with a HE-friendly layer that implements a Power SoftMax function or Length-Agnostic Power SoftMax function that does not have exponent terms, e.g., $e^x$ (step 520). The modified DL computer model is then trained using the same hyperparam-eters received with the original DL computer model archi-tecture (step 530). Post-training, if there are other non-polynomial layers, such as layer normalization and activations function like GeLU, several techniques, such as range loss term based tuning (step 540), or other finetuning (step 550) can be applied to reduce the ranges of the inputs to non-polynomial operations, making the approximations of other non-polynomial components easier.

Thereafter, the trained DL architecture, for example a transformer based computer model, is approximated with polynomials (step 560). The resulting trained HE optimized DL computer model may then be output for deployment to an HE computation system or the like for processing encrypted HE workloads and providing encrypted results (step 570). The operation then terminates.

Thus, with the mechanisms of the illustrative embodiments, assuming a transformer based architecture, given the transformer architecture, the SoftMax layer is replaced with the Power SoftMax of the illustrative embodiments. The model is then trained from scratch on the training data. Post-training, the division in the SoftMax is replaced with polynomials, obtaining completely polynomial attention layers. If there are other non-polynomial components in the model, such as ReLU, GeLU, or layer normalization, additional steps are performed, such as further fine-tuning or fine-tuning with range-loss. The resulting mechanism provides a lower multiplication depth, increased accuracy, and decreased latency over SoftMax based mechanisms and other options for replacement of the SoftMax layer so as to make deep learning architectures amenable to HE operations.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing a deep learning (DL) computer model for homomorphic encryption (HE) workload processing, the computer-implemented method comprising:

receiving an original DL computer model architecture that is to be optimized for HE workload processing;

modifying the original DL computer model architecture by replacing a self-attention layer of the original DL computer model with a HE friendly self-attention layer that comprises a Power SoftMax function that does not have exponent terms, to thereby generate a modified DL computer model architecture;

executing a machine learning training of the modified DL computer model architecture;

approximating one or more elements of the Power SoftMax function with polynomials to generate a trained HE optimized DL computer model; and outputting the trained HE optimized DL computer model for execution on HE workloads;

wherein the Power SoftMax function comprises polynomial terms to replace non-polynomial terms, the non-polynomial terms being exponent terms, the polynomial terms being power terms; and wherein the Power SoftMax function employs an approximation of division terms over a scale-agnostic range.

2. The computer-implemented method of claim 1, wherein the Power SoftMax function replaces the non-polynomial terms, in a SoftMax function of the original DL computer model architecture, with the polynomial terms.

3. The computer-implemented method of claim 2, wherein the non-polynomial terms are the exponent terms in the SoftMax function.

4. The computer-implemented method of claim 1, wherein approximating one or more elements of the Power SoftMax function with polynomials to generate the trained HE optimized DL computer model is performed after training the modified DL computer model architecture.

5. The computer-implemented method of claim 4, wherein approximating one of more elements of the Power SoftMax function with polynomials comprises approximating a division operation of the Power SoftMax function with a polynomial.

6. The computer-implemented method of claim 4, wherein approximating one or more elements of the Power SoftMax function comprises implementing a Length-Agnostic Power SoftMax function based on a non-encrypted L sequence length of an input ciphertext.

7. The computer-implemented method of claim 1, wherein the original DL computer model architecture is a Transformer DL computer model architecture.

8. The computer-implemented method of claim 1, further comprising:

deploying the trained HE optimized DL computer model on one or more server computing systems for runtime execution; and executing the trained HE optimized DL computer model on HE workloads received from one or more client computing devices.

9. The computer-implemented method of claim 1, wherein the trained HE optimized DL computer model is hosted on a server side data processing system and the method is executed in response to a request from a client computing device, wherein the request specifies the original DL computer model architecture and one or more characteristics of the HE workload processing to be performed by the original DL computer model.

10. A computer program product comprising a computer readable storage medium having a computer readable program stored therein, wherein the computer readable program, when executed on a computing system, causes the computing system to optimize a deep learning (DL) computer model for homomorphic encryption (HE) workload processing, at least by:

receiving an original DL computer model architecture that is to be optimized for HE workload processing;

modifying the original DL computer model architecture by replacing a self-attention layer of the original DL computer model with a HE friendly self-attention layer that comprises a Power SoftMax function that does not have exponent terms, to thereby generate a modified DL computer model architecture;

executing a machine learning training of the modified DL computer model architecture;

approximating one or more elements of the Power SoftMax function with polynomials to generate a trained HE optimized DL computer model; and outputting the trained HE optimized DL computer model for execution on HE workloads;

wherein the Power SoftMax function comprises polynomial terms to replace non-polynomial terms, the non-polynomial terms being exponent terms, the polynomial terms being power terms; and wherein the Power SoftMax function employs an approximation of division terms over a scale-agnostic range.

11. The computer program product of claim 10, wherein the Power SoftMax function replaces the non-polynomial terms, in a SoftMax function of the original DL computer model architecture, with the polynomial terms.

12. The computer program product of claim 11, wherein the non-polynomial terms are the exponent terms in the SoftMax function.

13. The computer program product of claim 10, wherein approximating one or more elements of the Power SoftMax function with polynomials to generate the trained HE optimized DL computer model is performed after training the modified DL computer model architecture.

14. The computer program product of claim 13, wherein approximating one of more elements of the Power SoftMax function with polynomials comprises approximating a division operation of the Power SoftMax function with a polynomial.

15. The computer program product of claim 13, wherein approximating one or more elements of the Power SoftMax function comprises implementing a Length-Agnostic Power SoftMax function based on a non-encrypted L sequence length of an input ciphertext.

16. The computer program product of claim 10, wherein the original DL computer model architecture is a Transformer DL computer model architecture.

17. The computer program product of claim 10, wherein the computer readable program further causes the computing system to:

deploy the trained HE optimized DL computer model on one or more server computing systems for runtime execution; and execute the trained HE optimized DL computer model on HE workloads received from one or more client computing devices.

18. An apparatus comprising:

at least one processor; and at least one memory coupled to the at least one processor, wherein the at least one memory comprises instructions which, when executed by the at least one processor, cause the at least one processor to optimize a deep learning (DL) computer model for homomorphic encryption (HE) workload processing, at least by:

receiving an original DL computer model architecture that is to be optimized for HE workload processing;

modifying the original DL computer model architecture by replacing a self-attention layer of the original DL computer model with a HE friendly self-attention layer that comprises a Power SoftMax function that does not have exponent terms, to thereby generate a modified DL computer model architecture;

executing a machine learning training of the modified DL computer model architecture;

approximating one or more elements of the Power SoftMax function with polynomials to generate a trained HE optimized DL computer model; and outputting the trained HE optimized DL computer model for execution on HE workloads;

wherein the Power SoftMax function comprises polynomial terms to replace non-polynomial terms, the non-polynomial terms being exponent terms, the polynomial terms being power terms; and wherein the Power SoftMax function employs an approximation of division terms over a scale-agnostic range.

* * * * *